Nov. 1, 1927.

R. V. TERRY 1,647,156

HYDRAULIC TURBINE

Filed Oct. 27, 1926

INVENTOR.
Roger V. Terry
BY His Attorneys,
Sheffield & Betts

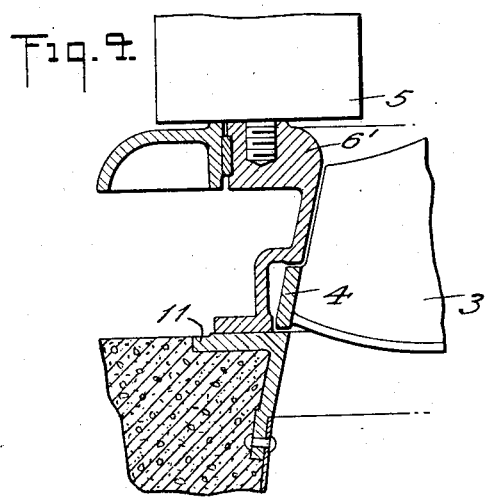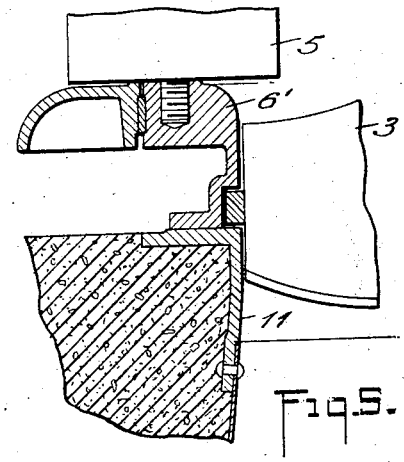

Patented Nov. 1, 1927.

1,647,156

UNITED STATES PATENT OFFICE.

ROGER VERNON TERRY, OF HILTON VILLAGE, VIRGINIA, ASSIGNOR TO NEWPORT NEWS SHIPBUILDING AND DRYDOCK COMPANY, A CORPORATION OF VIRGINIA.

HYDRAULIC TURBINE.

Application filed October 27, 1926. Serial No. 144,499.

This invention relates to hydraulic turbines and more particularly to the construction of the same adjacent the shroud band, speed ring and other parts of the turbine adjacent thereto.

The object of the invention is to increase the efficiency of the turbine by reducing the amount of energy normally dissipated upon the shroud ring by friction caused by the passage of water through the runner. This and other advantages will be apparent to those skilled in the art, and are brought about by the constructions claimed and described below, without any impairment of the functions of other parts of the common forms of turbine, which are modified to accomplish the desired results.

For a detailed description of the several modifications of my improved turbine which I at present deem preferable, reference may be had to the following specification and the accompanying drawings forming a part thereof, in which Figs. 1 and 2 show developments of portions of the shroud band on which velocity diagrams are placed indicating the flow of the water as it passes between the vanes at specific speeds of 70 to 115, respectively;

Fig. 4 is a fragmentary cross-sectional view of a turbine showing a preferred form of shroud band as applied to an open flume turbine;

Fig. 5 is a similar view showing the runner of an open flume turbine having the shroud band at the intermediate position on the ends of the runner vanes.

It is the customary practice in the design of hydraulic turbine runners of the inward flow and combined inward and axial flow types, known in general as the Francis type, having specific speeds in the foot pound system from 15 to about 120, to provide a shroud band or ring around the entire width of the outer ends of the runner vanes just below the inlet passage for the water. The inner surface of this band provides an outer rotating wall for the passage of water through the runner and serves to stiffen and strengthen the runner as a whole by tying together the outwardly extending ends of the runner vanes. Vibration, which would otherwise be likely to occur from the passage of the water through the runner, is thus eliminated. It also provides means in conjunction with a shoulder formed at the lower end of the speed ring, the upper end of the draft tube or the foundation ring, depending upon the particular design of the turbine, which may be used to support the runner during assembly or repair.

In the usual type of shroud band construction now employed in the art the band extends substantially across the entire width of the outer ends of the runner vanes. This construction results in a decrease in turbine efficiency, due to the loss in energy of the water by friction during its long diagonal passage across the width of the band.

The loss in energy of the flow of a liquid across a surface is expressed by the formula:

$$E_L = KSV^3$$

$E_L$ in this equation is the energy lost in frictional resistance due to the passage of a fluid over the surface or passage of the surface through the fluid measured in foot pounds per second.

K is a constant determined by the character of the surface.

S is the surface area in square feet.

V is the velocity of the surface relative to the fluid in feet per second.

From the above formula it may be seen that the energy loss due to the frictional resistance of the water upon the shroud band varies as the cube of the velocity.

In the preferred form of my invention the width of the shroud band parallel to the turbine axis is reduced so that the supporting or steadying parts do not extend the full width of the tips or outer ends of the runner vanes, as in the usual construction of shroud bands. Sufficient width of such parts is on the other hand retained to hold the blades in position and to enable the shroud band to perform its functions as outlined above. This reduction in the width of the band reduces the area thereof exposed to the water passing through the runner and consequently reduces the frictional loss associated therewith. The portion of the band thus eliminated has substituted therefor a stationary member or ring which serves as a limiting member or guiding wall for the water passing through the runner. This stationary ring may be an integral part of the casing, the speed ring, the curb or lower distributor plate below the wicket gates or it may be a separate member suitably held in the desired position.

Figure 1:
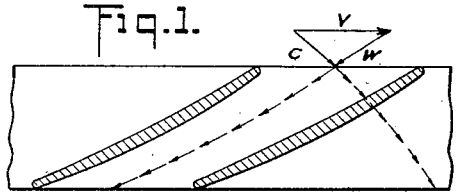
Figure 2:
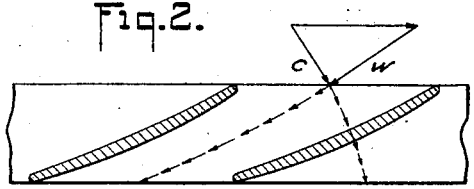

While this stationary ring substituted for a portion of the shroud band offers some resistance to the flow of water through the runner, it will be shown that this resistance in the case of high specific speed turbines is materially less than the resistance offered by the portion of the shroud band which it replaces. This reduction in the frictional resistance may be demonstrated by referring to Figs. 1 and 2, in which V represents the tangential speed of the runner, C represents the absolute velocity of the water relative to a stationary part, the inclination depending upon the angular positions of the blades of the wicket gate, and W represents the velocity of the water relative to the runner vanes and shroud band. It is seen that the velocity W of the water relative to the band, is higher than the velocity C of the water relative to the stationary part, such as the fixed speed ring when brought adjacent the ends of the vanes. By comparing the velocity diagrams of Figs. 1 and 2, it will be observed that the ratio of W to C increases with the specific speed. In the usual type of hydraulic turbine operating at a specific speed of 115, the value of W is at least twice the value of C. Since the frictional loss due to the water passing the shroud band varies as the cube of the velocity, for the same surface area and character of surface, the frictional loss due to the diagonal path of the water against a shroud band fixed to the vanes is about eight times the frictional loss on a stationary ring adjacent to which the tips of the runner vanes immediately rotate.

Another reduction in the frictional resistance is effected by the substitution of the stationary ring for a portion of the shroud band, in that for the same depth of runner vanes at the outer periphery of the runner, approximately half the surface area is eliminated because the shroud band has its inner and outer surfaces in contact with the water whereas the stationary ring has only its inner surface in contact with the water. A further reduction in the loss of energy caused by the shroud band is effected by the character of the surface of the stationary ring. The inside surface of the stationary ring may be machined or surfaced in a boring mill, whereas the inside surface of the runner band cannot be so surfaced. The machining of this surface results in decreasing the value of the constant K in the above formula. In fact, experiments show that the friction represented by K for an unfinished surface of the shroud band may be twice the friction for the finished surface of the stationary ring.

Figure 3:
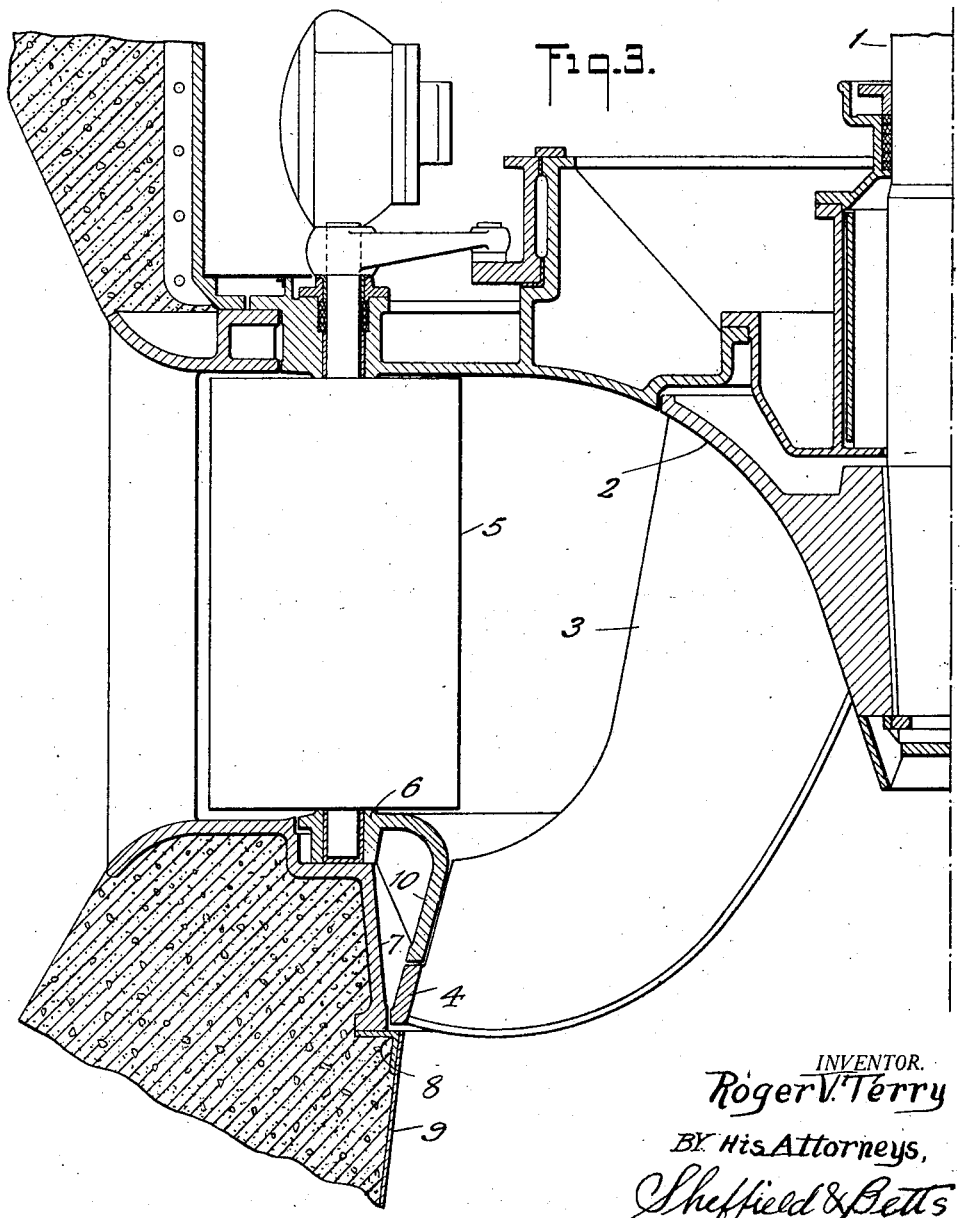
Fig. 3 is a cross-sectional view of one side of the runner of a turbine and its adjacent parts, showing my improved shroud band and embodying the preferred form thereof.

In Fig. 3 of the drawings one form of my improved turbine is illustrated. The numeral 1 indicates a turbine shaft having a runner 2 provided with vanes 3 secured to its lower end. The shroud ring or band 4 connects only a portion of the tips of the runner vanes 3 as shown. The flow of water to the runner is controlled by a circular series of pivoted wicket gates or blades 5 arranged opposite the entrance part of the runner, to which water is supplied in the usual manner, in this case by a radial inflow and axial outflow. The wicket gates 5 are supported by a curb plate 6 which serves as the lower distributor plate in which the gates are pivoted and with which the stationary ring 10 is integral. They may be removed when it is desired to lift out the runner. A speed ring 7 serves, in turbines of the spiral casing type, as a foundation ring to which the curb plate 6 may be bolted. For simplicity, the means employed to fasten the curb plate to the speed ring, as well as the means used to fasten other adjacent parts, are omitted from the drawings. The draft tube 9 is attached to the speed ring in any suitable manner, as by the angle iron 8. In the particular embodiment shown in Fig. 3, a shoulder at the lower portion of the speed ring formed by the angle iron 8 serves as a support for the runner when erecting or dismantling the turbine. It will be appreciated that this shoulder may be made integral with the speed ring 7 if it be desired.

With the open flume type of construction shown in Fig. 4, no speed ring is used. The distributor plate 6' is bolted or otherwise securely fastened to a foundation ring 11, and in this construction the upper portion of the distributor plate is formed in such a way as to lie close to the outer ends of the runner vanes not covered by the shroud band. The curb plate extends over the runner band and may be removed from the foundation ring before the runner is taken out of position. The foundation ring 11 serves as a support for the runner when the turbine is being erected or dismantled.

In the preferred embodiment of my invention the portion of the shroud band retained is of more than sufficient strength to hold the outer ends of the runner vanes rigidly together, and may be any part of the band that is substantially less than the width in the usual construction where the entire width of the outer ends of the runner vanes is shrouded. It is obvious that the narrower the shroud band is made the greater will be the increase in efficiency, power and speed of the runner resulting therefrom.

The part of the band retained is preferably located at the bottom or discharge end of the runner, since, due to the shape and curvature of the vanes, their slope at this point is smaller, and a larger portion of each vane in the tangential direction is thereby connected to the shroud band for a given depth of band. This positioning of the shroud band also provides a better supporting means for the runner due to the flare of the band in the direction of the discharge. If in any particular installation, however, it is desired, the part of the shroud band retained may be located intermediate or slightly below the center of the outer tips of the runner vanes, as shown in Fig. 5.

I do not desire to be limited to the exact details shown, nor to the types of turbines herein illustrated, as modifications may be made by those skilled in the art and still be within the scope of the appended claim without departing from the spirit of my invention.

What I claim and desire to protect by Letters Patent is:

In a turbine, a runner, a shroud band of substantially less width than the ends of the runner vanes and positioned at the lower portions of the margins of said ends, and stationary means adjacent the unshrouded portions of the runner vanes adapted to guide the actuating fluid therethrough.

ROGER VERNON TERRY.

Certificate of Correction.

Patent No. 1,647,156.                          Granted November 1, 1927, to

ROGER VERNON TERRY.

It is hereby certified that error appears in the printed specification of the above-numbered patent requiring correction as follows: Page 1, line 28, for the word "to" read *and;* and that the said Letters Patent should be read with this correction therein that the same may conform to the record of the case in the Patent Office.

Signed and sealed this 22d day of November, A. D. 1927.

[SEAL.]                                    M. J. MOORE,
*Acting Commissioner of Patents.*